US007017808B2

(12) United States Patent
Holzer

(10) Patent No.: US 7,017,808 B2
(45) Date of Patent: Mar. 28, 2006

(54) ELECTRONIC TRACKING SYSTEM FOR A COMBINATION OF SPORTING ARTICLES CONSISTING OF MORE THAN ONE SPORTING ARTICLE AND THE USE OF SAME

(75) Inventor: Helmut Holzer, St. Johann (AT)

(73) Assignee: ATOMIC Austria GmbH, Altenmarkt im Pongau (AT)

( * ) Notice: Subject to any disclaimer, the term of this patent is extended or adjusted under 35 U.S.C. 154(b) by 0 days.

(21) Appl. No.: 10/685,969

(22) Filed: Oct. 15, 2003

(65) Prior Publication Data

US 2004/0074966 A1    Apr. 22, 2004

(30) Foreign Application Priority Data

Oct. 15, 2002   (AT)   ............................. A 1562/2002

(51) Int. Cl.
*G06F 19/00* (2006.01)
(52) U.S. Cl. ..................... 235/385; 340/572.1; 340/540
(58) Field of Classification Search ................ 235/385; 340/572.1, 540
See application file for complete search history.

(56) References Cited

U.S. PATENT DOCUMENTS

| 5,959,530 | A  | * | 9/1999 | Lupien et al. ........... 340/568.1 |
| 6,031,863 | A  | * | 2/2000 | Jusa et al. ................... 375/132 |
| 6,275,153 | B1 |   | 8/2001 | Brooks |
| 6,554,188 | B1 | * | 4/2003 | Johnson et al. ............. 235/385 |
| 2001/0000118 | A1 | * | 4/2001 | Sines et al. ................. 273/274 |
| 2002/0121980 | A1 | * | 9/2002 | Wan et a. ................. 340/572.1 |
| 2003/0023337 | A1 | * | 1/2003 | Godfrey et al. ............. 700/109 |
| 2003/0163287 | A1 | * | 8/2003 | Vock et al. ................. 702/187 |

FOREIGN PATENT DOCUMENTS

AT   000601   1/1996

(Continued)

OTHER PUBLICATIONS

"Magic Wardrobe: Situated Shopping from you own Bedroom" article by Wan in "Personal Technologies"(2000) 4: 234-237.*

*Primary Examiner*—Daniel Stcyr
*Assistant Examiner*—Daniel A. Hess
(74) *Attorney, Agent, or Firm*—Collard & Roe, P.C.

(57) ABSTRACT

The invention relates to an electronic tracking system (1) for a combination of sporting articles (2) consisting of more than one sporting article and the potential applications thereof. At least two code transmitters (7) are provided, which are assigned to at least two structurally separate sporting articles. For the purposes of the invention, these code transmitters (7) or their data can be contactlessly detected by at least one separate control unit (6; 9). In another embodiment of the invention, a data transmission between the code transmitters (7) and a separate control unit (6; 9) via an encryption module (32) in a network can not be mistaken or account is taken of the fact that predefined sporting articles are designed beforehand as belonging to one another. In another embodiment of the invention, the control unit (6; 9) can record the codes of sporting articles belonging to a combination of sporting articles (2) and/or the code transmitters (7) of these sporting articles are assigned a code to designate that the various sporting articles belong to a combination of sporting articles (2). In yet another embodiment of the invention, the code transmitters (7) and/or at least one of the code transmitters (7) and the control unit (6; 9) are able to communicate up to a distance of 30 m.

30 Claims, 5 Drawing Sheets

FOREIGN PATENT DOCUMENTS

| | | |
|---|---|---|
| DE | 19644035 | 5/1998 |
| DE | 198 24 323 | 12/1999 |
| DE | 20112167 | 11/2001 |
| EP | 0 441318 | 2/1991 |
| EP | 0 621 566 | 10/1994 |
| EP | 1190750 | 3/2002 |
| FR | 2778987 | 11/1999 |
| WO | WO99/54005 | 10/1999 |
| WO | WO01/82235 | 11/2001 |
| WO | WO02/25584 | 3/2002 |

* cited by examiner

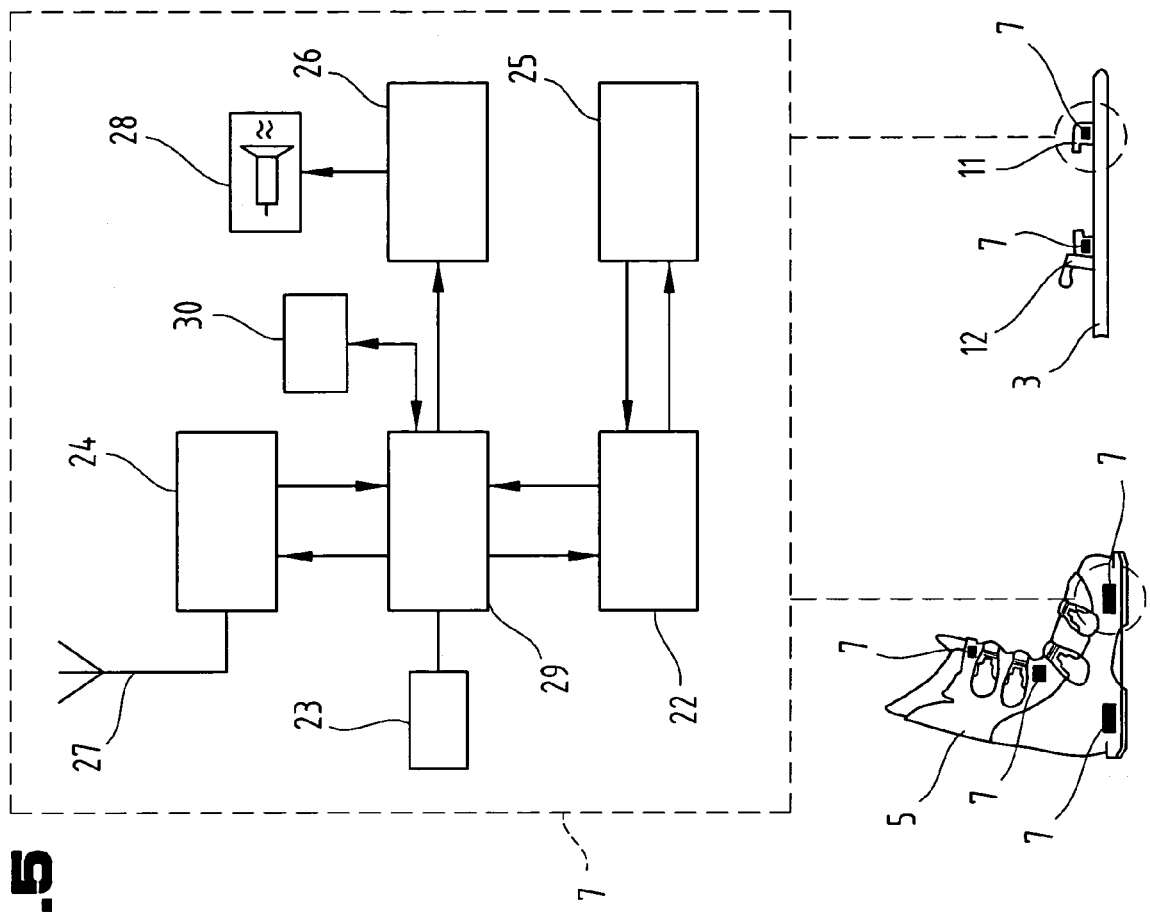
Fig.5
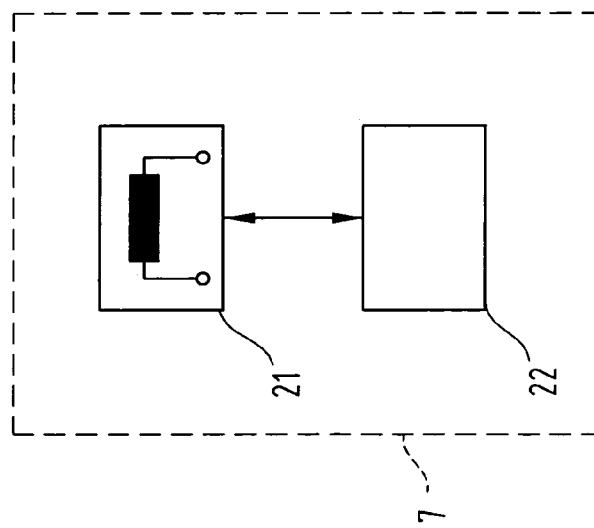
Fig.4
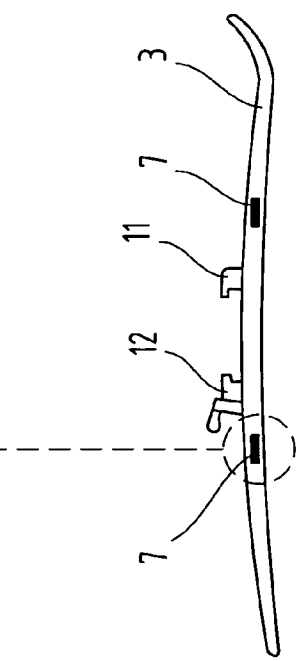

ELECTRONIC TRACKING SYSTEM FOR A COMBINATION OF SPORTING ARTICLES CONSISTING OF MORE THAN ONE SPORTING ARTICLE AND THE USE OF SAME

BACKGROUND OF THE INVENTION

1. Field of the Invention

The invention relates to an electronic tracking system for a combination of sporting articles consisting of several sporting articles, comprising at least two code transmitters, which are assigned to at least two structurally independent sporting articles, as well as the possible applications of an electronic tracking system.

2. The Prior Art

Patent specification WO 99/54005 A1 describes a method of identifying sporting articles, in particular a ski or surf board, a shoe or water sports equipment, by means of labels, which can be read without the need for any contact. The label has a first memory zone containing a clear identification of the label and a second re-writeable memory zone in which data transmitted from an external device can be stored.

Patent specification U.S. Pat. No. 6,275,153 B1 describes a ski lift system, in which the various chair lift tracks are provided with RFID reading devices and a RFID transponder is provided on a ski or snowboard, thereby enabling an identification number to be read. In another embodiment, a card with a magnetic stripe is described and the identification of the RFID transponder is stored on this magnetic card and predefined actions are initiated on the basis of a comparison and verification of the stored data.

Patent specification EP 0 441 318 B1 discloses a ski with a permanent identification label, integrated in an adhesive layer in a ski, provided in the form of a magnetic bar code, for example. The label is integrated right at the start of the manufacturing process and is therefore not visible and can not be mechanically damaged.

Patent specification WO 02/25584 A1 describes a composite, in other words a flat, layered laminate, with a RFID or EAS element, which can be affixed in close proximity to an adjoining metal object. This RFID composite label has a foam-expandable layer of material which can absorb RF radiation, which reduces the density on activation, thereby increasing the distance from the metal object. This reduces attenuation of the RFID antenna by the metal object, preventing the RFID antenna from deviating from the set tuning.

Patent specification DE 201 12 167 U1 discloses a ski board with a label designed to exchange data and the label is positioned at a distance several or 2 mm from each metallic body in the laminate. However, the reading range which can be achieved as a result is not sufficient or satisfactory for all applications.

Patent specification DE 196 44 035 A1 discloses a system for identifying moving sports equipment by means of a passive transponder, which may contain information that can be read by means of a sensor, provided externally to the sports equipment or connected to it, and a display device.

Document AT 000 601 U1 discloses a method in which a data carrier is inserted in part of a piece of equipment, which can be verified via a control station of the sports facility. In one embodiment of this access control system for sports facilities, the data carrier is inserted in the piece of apparatus during manufacture. The piece of apparatus is described as being a ski, the rear end region of a ski, a ski binding component, a ski stick, the toe or heel region or a shoe.

Patent specification WO 01/82235 A1 describes a hire system for sports equipment, in which the hired sports equipment (hire ski) is fitted with a data carrier which operates contactlessly and carries certain personal identification data which is the same as that contained in the data carrier authorising access. This data carrier communicates with a device at the access terminal via a reading device. It compares the personal identification data on the data carrier of the sporting article with the data stored on the data carrier used for authorising access. In addition to personal data, other data relating to the hire transaction can also be stored on the data carrier and the hire data can be stored on the access terminal so that access can be barred if the data does not match.

SUMMARY OF THE INVENTION

The underlying objective of the present invention is to propose an electronic tracking system for a combination of sporting articles consisting of more than one sporting article, which enables a contactless networking of identification codes and data within a combination of sporting articles and which offers a plurality of practicable applications.

This objective is achieved by the invention due to the fact that code transmitters or their data can be contactlessly detected by at least one separate control unit.

The advantage of this approach is that the electronic tracking system enables combinations of sporting articles consisting of at least two sporting articles to be unambiguously identified by code transmitters, and the data stored in the code transmitters can be specifically assigned to the different sporting articles making up the combination of sporting articles, thereby providing the facility for an at least largely automated system of controlling and tracking sporting articles belonging to a set of combined sporting articles or monitoring their safety. Alternatively or in combination, the at least individual sporting articles belonging to a combination of sporting articles can be linked to a user or owner and verified. Due to the fact that this data can be detected contactlessly by a control unit, operation of the tracking system and the actual tracking process itself is made easier to manipulate. The detection and control process is uncomplicated and quick, both for the operator of the tracking system and for the user.

In one embodiment of the electronic tracking system, the control unit checks or determines at least individual sporting articles to ascertain to which combination of sporting articles they belong or runs to ensure they are a correct match, and the advantage of this is that the individual sporting articles can be checked on a largely automated basis to determine the combination to which they belong or to ensure that they are a correct match. As a result, any situation in which the safety of the user might be compromised, such as might occur due to the use of sporting articles which do not belong with one another or are not intended to be used together, can be prevented or at least a warning issued.

The advantage of limiting the detection range to a maximum of 3 m, in particular 1 m, is that it prevents any mutual interference with other tracking systems as far as possible. On the other hand, it enables basic parameters to be clearly defined in order to establish error-free communication for specific purposes.

If the electronic tracking system is configured so that at least one of the code transmitters is provided in the form of a transponder, standard and readily available code transmitters can be used for the system, thereby keeping the cost of fitting individual sporting articles with appropriate code transmitters low.

Configuring the electronic tracking system to operate with transponders which do not require batteries means that the code transmitters can be integrated in the respective sporting articles and will not require any maintenance.

Configuring the electronic tracking system with transponders that are connected to a power supply system offers the possibility of using active code transmitters with their own power supply unit, making them independent of external power sources. This individual power supply systems also enables a relatively long and reliable communication range to be obtained.

Another approach which offers advantages is to design the electronic tracking system so that the transponder has a memory system with a random access memory and/or a read-only memory (ROM), enabling data specific to sporting articles and users to be stored, so that it can be easily read and stored in a random access memory. Production data or other hard data can be safely stored in a read-only memory.

Another embodiment of the electronic tracking system in which the transponder has a computer device, in particular a micro-controller and a memory system, offers the advantage that data can be stored in the memory device of the code transmitter so that it can be processed and manipulated directly by the computer device and the results of this processing written back to the memory device.

In another advantageous embodiment of the electronic tracking system, one of the code transmitters can be integrated in a board-type runner device, so that data specific to a sporting article and/or a user can be unambiguously assigned to a board-type runner device and this data will then be available for reading in the code transmitter integrated in the board-type runner device.

The electronic tracking system can be configured so that at least one of the code transmitters is integrated in a sport shoe, so that data specific to a sporting article and/or a user can be unambiguously assigned to the sport shoe and this data will then be available for reading in the code transmitter integrated in the sport shoe.

In another embodiment of the electronic tracking system, one of the code transmitters is integrated in a retaining mechanism for a sport shoe, so that data specific to a sporting article and/or a user can be unambiguously assigned to a retaining mechanism for a sport shoe and this data will then be available for reading in the code transmitter.

In another embodiment of the electronic tracking system, at least one of the code transmitters incorporates an active transmission system for electromagnetic waves and/or permitting one-way or two-way communication with other code transmitters and/or the control unit, so that a one- or two-way communication can be established across longer distances with other code transmitters or with a control unit, so that data pertaining to the individual sporting articles can be exchanged or read.

In another embodiment of the electronic tracking system, the control unit is advantageously driven by software on a standard portable computer unit, which enables the functions of the control unit to be extended or edited in a simple manner, merely by editing the software, thereby making it relatively easy to adapt the system to suit requirements.

In one embodiment, the control unit is a mobile computer unit with at least one interface for enabling a local or remote transmission of signals and data via a local-area or global network, thereby providing a simple means of communicating with other devices in a local-area or global network.

In one embodiment of the electronic tracking system, the local-area or global network is operated on the basis of a radio network, thereby obviating the need for complex wiring between communicating sites.

In one embodiment of the electronic tracking system, the control unit is provided in the form of a so-called palmtop, handheld computer or a mobile telephone, the advantage of which is that it enables the use of relatively inexpensive standard equipment that has been widely tried and tested, so that the control unit can be programmed to operate the desired functions through appropriate software.

In one embodiment of the electronic tracking system, the control unit is provided in the form of a computer unit which can be worn on the human body and is powered on an autarchic basis by electric power networks or has its own power supply, preferably in the form of a wrist watch or a so-called wrist-top computer, the advantage of which is that the control unit can be integrated in a wrist watch so that it causes no, or at least very little, discomfort to the user.

Also of advantage is another embodiment, in which the control unit is provided in the form of a software-driven mobile telephone for UMTS mobile telephone networks, which means that an existing mobile telephone can be used as the control unit merely by adapting the software and the operating system.

As a result of the advantageous embodiment of the electronic tracking system in which the control unit has a transmitter and/or receiver unit for electromagnetic waves which can be received and/or transmitted by the code transmitters, a communication or data exchange or data reconciliation can be established wirelessly between the individual code transmitters and the control unit.

If the electronic tracking system is configured so that the transmitter and/or receiver unit incorporates an electric coil, code transmitters can be powered by induction, thereby obviating the need to provide a separate power supply system inside the code transmitter.

In another embodiment in which several code transmitters for specific sporting articles belonging to a set or intended to be used together are assigned an identification code so that they can not be confused with other groups of sporting articles, sporting articles which are very different in construction but nevertheless belong to the same set can be tagged together as part of one unmistakable group.

In another embodiment of the electronic tracking system, at least one of the code transmitters assigned to a retaining mechanism contains and displays data relating to the properties and/or settings of the retaining mechanism, which means that data pertaining to the settings of the retaining mechanism, for example, can be read and stored and this data can then be used to run a check or ensure that the retaining mechanism matches a specific sport shoe or user.

In another embodiment of the electronic tracking system, at least one code transmitter assigned to a sport shoe contains and displays data relating to the properties and/or settings of the sport shoe, which means that data pertaining to the sport shoe can be read and binding settings applied or modifications made in order to adapt to user-specific requirements, for example.

Also of advantage is another embodiment of the electronic tracking system, in which at least one code transmitter assigned to a board-type runner device contains and displays data relating to the properties and/or settings of the board-type runner device, so that data pertaining to specific sports equipment can be read and stored on an automated basis and a match made with other sporting articles or in respect of a user.

In one embodiment, at least one of the code transmitters contains and displays physiological and/or performance-related data pertaining to the associated user or operator, so that this performance-related data can be used to adapt the respective sporting article more closely to the requirements or physiology of the user.

In one embodiment of the electronic tracking system, the control system can be worn on the body of the user and may contain and display physiological and/or performance-related data pertaining to the user or operator, the advantage of which is that specific aspects personal data about the user is virtually always available irrespective of the sporting articles.

In another embodiment of the electronic tracking system, the control unit is stationary and is disposed in front of or in an access area to sports facilities, lifts or pistes, the advantage of which is that it offers a simple means of running an authorisation check in the access area to sports facilities, for example.

In an embodiment of the electronic tracking system in which the control unit has at least one visual and/or acoustic output system for issuing warnings or information, information or warnings can be simply and rapidly heard and displayed.

In another embodiment of the electronic tracking system, at least one of the sporting articles has at least one visual and/or acoustic output system for issuing warnings and/or information, the advantage of which is that relevant information can be output directly on the sporting article.

In another embodiment, at least one of the code transmitters contains and displays personal data or data relating to the owner, which provides a simple means of controlling access and authorisation.

The advantage of a configuration of the electronic tracking system in which the control unit checks the data of the at least one code transmitter on the sport shoe and the data of the at least one code transmitter of the retaining mechanism to ensure correct use or check that they belong to the correct combination, is that it can prevent injury to the user in situations where the sport shoe is not being used with the correct retaining mechanism for a sport shoe.

In another embodiment of the electronic tracking system, the control unit checks the data of the code transmitter of the retaining mechanism and the data of the code transmitter of the user or the data of a personal user-end control unit to ascertain correct usage or correct assembly of combinations, the advantage of which is that because the settings of the retaining mechanism for a sport shoe are checked along with the user data, an inadmissible setting or a change made to such a setting can be detected.

The advantage of the configuration in which the control unit can load or call data via a standardised communication interface up or down from a public communications network, for example the Internet, is that data such as service parameters for example, can be exchanged with other computers of the manufacturer worldwide, for example across the Internet.

In one embodiment of the electronic tracking system, the data of at least one code transmitter consists of codes or pointers for data sets stored in the control unit and/or in an external data network, the advantage of which is that large data sets can be stored in the communication system or in an external data network and only pointers to these data sets will need to be stored and displayed in the code transmitters.

In another embodiment of the electronic tracking system, the data of the code transmitters can be set up and/or edited by an authorised service only, which advantageously prevents unauthorised tampering with the data in the code transmitters.

In one embodiment of the electronic tracking system, at least one of the code transmitters is connected to at least one sensor for detecting system-relevant parameters or changes in the values of parameters, enabling sensors to transmit instantaneous measurement values or parameter settings to the code transmitters, for example, thereby permitting a response to these sensor measurement values.

In another embodiment of the electronic tracking system, the sensor is programmed to detect a release force of the retaining mechanism, in particular to detect a Z-value setting of a safety ski binding, as a result of which sensors can detect the Z-value of the retaining mechanism for a sport shoe and transmit it to code transmitters.

The advantage of an embodiment of the electronic tracking system in which the control unit is programmed to interrogate the code transmitters as and when necessary or on a periodically recurring basis and this data is processed on the basis of or assisted by software, is that data from the code transmitters can be detected depending on requirements, e.g. by the service operator, and processed with the assistance of software.

The objective of the invention is achieved independently due to the fact that a data transmission can be run across a network between the code transmitters and a separate control unit via an encryption system without being confused with others or the sporting articles can be processed as a predefined set. The advantage of this approach is that sporting articles belonging to a sporting article combination consisting of at least two sporting articles are able to communicate within a network in such a way that a sporting article belonging to a combination of sporting articles is unambiguously identified during communication via the encryption module and associated sporting articles have a common encryption code. This securely rules out any communication or any data exchange, in particular an evaluation of technical data of the information exchanged or received by a control system or by a code transmitter which does not relate to the predefined combination of sporting articles. This system specifically ensures that only the respective information or data pertaining to sporting articles of a predefined group or within a set combination of sporting article is evaluated and taken into account. The communication system, which is preferably operated on a contactless or wireless basis, is therefore effectively able to prevent misinterpretations or the instigation of inappropriate actions due to parasitic signals from parties which do not belong to the associated network or communication system.

In another embodiment of the electronic tracking system, at least one of the code transmitters has a transmitter and/or receiver unit, for example an antenna or an electric coil, either in its integrated circuit or externally, which means that a transmitter and/or receiver unit can be provided directly in the integrated circuit of a code transmitter or alternatively in a separate place in order to be able to operate an efficient and long-range wireless data transmission to other systems.

In some embodiments of the electronic tracking system, one of the code transmitters is used to identify right-hand and/or left-hand sporting articles used in pairs and/or the control unit distinguishes between a sporting article specifically intended for right-hand use or left-hand use and checks that they are being used correctly and/or a code transmitter is assigned to a sport shoe and/or a board-type runner device intended for use as part of a pair and/or the control unit checks the use of the sporting article, in particular at least one board-type runner device, to ensure that it is being used on the correct side, the advantage of which is that it offers the possibility of being able to distinguish between sporting articles specifically designed to be used on the left-hand side or right-hand side, especially where sporting articles are designed to be used in pairs. By instigating appropriate actions, for example by issuing appropriate signals or alerts and/or even locking the respective sporting article to prevent it from being used, the user can be protected from injury which might otherwise occur due to incorrect use on the one hand, whilst the sporting article is no longer at risk of damage on the other. As an alternative to or in combination with the above, this automated control of to check that sporting article is being used in the intended manner is always available to the producer, to ensure maximum performance of the combination of sporting articles. This might apply, for example, in the case of specially made left-hand and right-hand skis, especially for skis with different external and internal radii or with mutually offset edge geometries.

In one embodiment of the electronic tracking system, at least one of the code transmitters and/or the control unit continuously logs changes to data and at least the most recent set of valid data is stored in a memory device, which means that edited data can be logged on a constant basis and stored in the memory device for subsequent evaluation. This enables useful statistical evaluations or historical logs to be produced.

Another embodiment of the electronic tracking system is of advantage because at least one of the sporting articles has a visual and/or acoustic output system to alert to theft and an output device on the sporting article will automatically issue an alert on detection of theft, thereby robbing criminals of any incentive to make off with such sporting articles.

In another embodiment of the electronic tracking system, a loose layer of highly permeable ferrite pigment or a film of ferrite is provided between metal elements of the sporting article and an immediately adjoining code transmitter, which reduces attenuation of the electromagnetic field by metal objects in the vicinity of the code transmitter. In particular, the code transmitters may be placed very close to the metal objects of a sporting article whilst nevertheless obtaining a relatively high reading range and detection distance between the code transmitters and an external control or reading unit. This significant increase in the maximum communication range is nevertheless achieved using relatively inexpensive and structurally simple means.

In another embodiment of the electronic tracking system, at least one of the code transmitters may be detachably affixed to the sporting article, the advantage of which is that code transmitters can be retrofitted on existing sporting articles without any difficulty.

In another embodiment of the electronic tracking system, the code transmitter is non-detachably affixed to a sporting article by means of a non-positive connection, for example by ultrasonic welding, vibration welding, friction welding, laser welding, bonding or similar, which means that relevant data to be protected prior to manipulation and code transmitters are virtually inseparable from the sporting article or can only be removed by force, necessarily causing damage.

The various applications of an electronic tracking system in terms of protecting against and deterring theft and/or tracking sporting articles stolen from a combination of sporting articles and/or enhancing the safety of a user and/or automating and/or improving production logistics and/or storage and/or retailing and/or assembly and/or hire and rental and/or maintenance and inspection and/or contactless access authorisation to sports facilities and/or lifts and/or pistes, offer a user inexpensive and reliable protection against theft of the sporting articles making up the combination of sporting articles and make it easier to keep track of missing sporting articles. Alternatively or in combination with the above, this electronic tracking system affords the user better protection against injury, by evaluating codes specific to sporting articles and/or users and issuing at least one appropriate warning if the automated evaluation or check detects certain anomalies. Alternatively to or in combination with the above, further advantages and improvements and simplifications can be obtained in terms of logistics and throughout the entire production process and/or in respect of subsequent service and hire operation, because individual sporting articles can be specifically identified by means of an at least partially automated tracking system. Alternatively to or in combination with the above, the specified electronic tracking system provides a simple and reliable means of controlling access to secured areas or areas where an admission fee is payable, which is particularly convenient for users and operators.

Irrespective of the above, the objective of the invention is independently achieved by means of an electronic tracking system, in which the code transmitters are linked to a control unit via a contactless communication link and the control unit registers the codes of sporting articles belonging to a combination of sporting articles and/or the code transmitters of these sporting articles assigns a code to the different sporting articles designating them as being part of a combination of sporting articles. The advantage of this is that a contactless communication between the code transmitters and the control unit is easy to operate and the control unit is able to recognise sporting articles as being part of an unmistakable combination of sporting articles on a largely automated basis using passive code transmitters that can not be tampered with and are as far as possible specific or unique, and the control unit is capable of allocating the corresponding group code to the matching sporting articles or their code transmitters making it very easy to add or remove individual elements to or from a combination of sporting articles. In particular, the system offers a passive and/or active detection and programming solution which is for the most part automated and above all requires very little in the way of manual operation but is nevertheless reliable and failsafe.

The objective of the invention is also independently achieved due to the fact that communication can be established between the code transmitters and the control unit via a contactless communication link and communication can be operated between the code transmitters and/or at least one of the code transmitters and the control unit across a distance of 30 m. The advantage of this is that a tracking system of this type offering contactless communication between the code transmitters and the control system is simple to set up across longer distances between communicating devices and offers seamless operation.

In another embodiment, reception sensitivity and/or a transmission range of the code transmitters is set and/or can be set to a maximum communication distance of approximately 1 m and/or a transmission range and/or the reception sensitivity of the control unit is set and/or can be set to a maximum communication distance of approximately 1 m from a code transmitter, the advantage of which is that because a maximum possible communication range can be set for the code transmitters and the control unit, the system can be readily adapted to suit the intended application and the site of application.

In one embodiment of the electronic tracking system, a communication interface of at least one code transmitter and/or a communication interface of the control unit co-operates with an encryption and/or decryption system, the advantage of which is that because the transmitted data is encrypted, it can not be intercepted, making it more difficult to misuse the exchanged and transmitted data.

In another embodiment of the electronic tracking system, at least one code transmitter and/or the control unit has a distance-measuring device for determining the distance to a possible communication site, thereby enabling a communication channel to be established within a pre-settable distance from the site or an action run in the tracking system to be initiated only at a predefined distance or orientation relative to a corresponding site. In particular, the respective actions will not be initiated except at a predefined distance from a corresponding site. Any undesirable or premature instigation of actions, such as passing an access control system but from too far a distance for example, can therefore easily be prevented.

Also of advantage is the embodiment of the electronic tracking systems, in which the control unit has a programming mode, by means of which the code transmitter of the sporting article belonging to a combination of sporting articles can be automatically detected, because all the sporting articles belonging to a combination of sporting articles can be largely automatically detected. Apart from improving the user-convenience of automated detection, the high level of error-free operation is also an important factor in a grouping system of this type.

The embodiment of the electronic tracking systems in which the control unit has a programming mode by means of which the code transmitter of the sporting article belonging to a combination of sporting articles can be programmed with unmistakable codes means that the sporting article belonging to a combination of sporting articles can be largely automatically and actively controlled by providing it with a group code by external programming.

BRIEF DESCRIPTION OF THE DRAWINGS

The tracking system proposed by the invention and its possible applications and uses will now be described in more detail with reference to examples of embodiments illustrated in the appended drawings. The simplified schematic diagrams given in the drawings are as follows:

FIG. 4 illustrates a first embodiment of an electronic code transmitter which can be used in the tracking system;

FIG. 5 illustrates another possible embodiment of a code transmitter for the electronic tracking system;

DETAILED DESCRIPTION OF PREFERRED EMBODIMENTS

Figure 1:
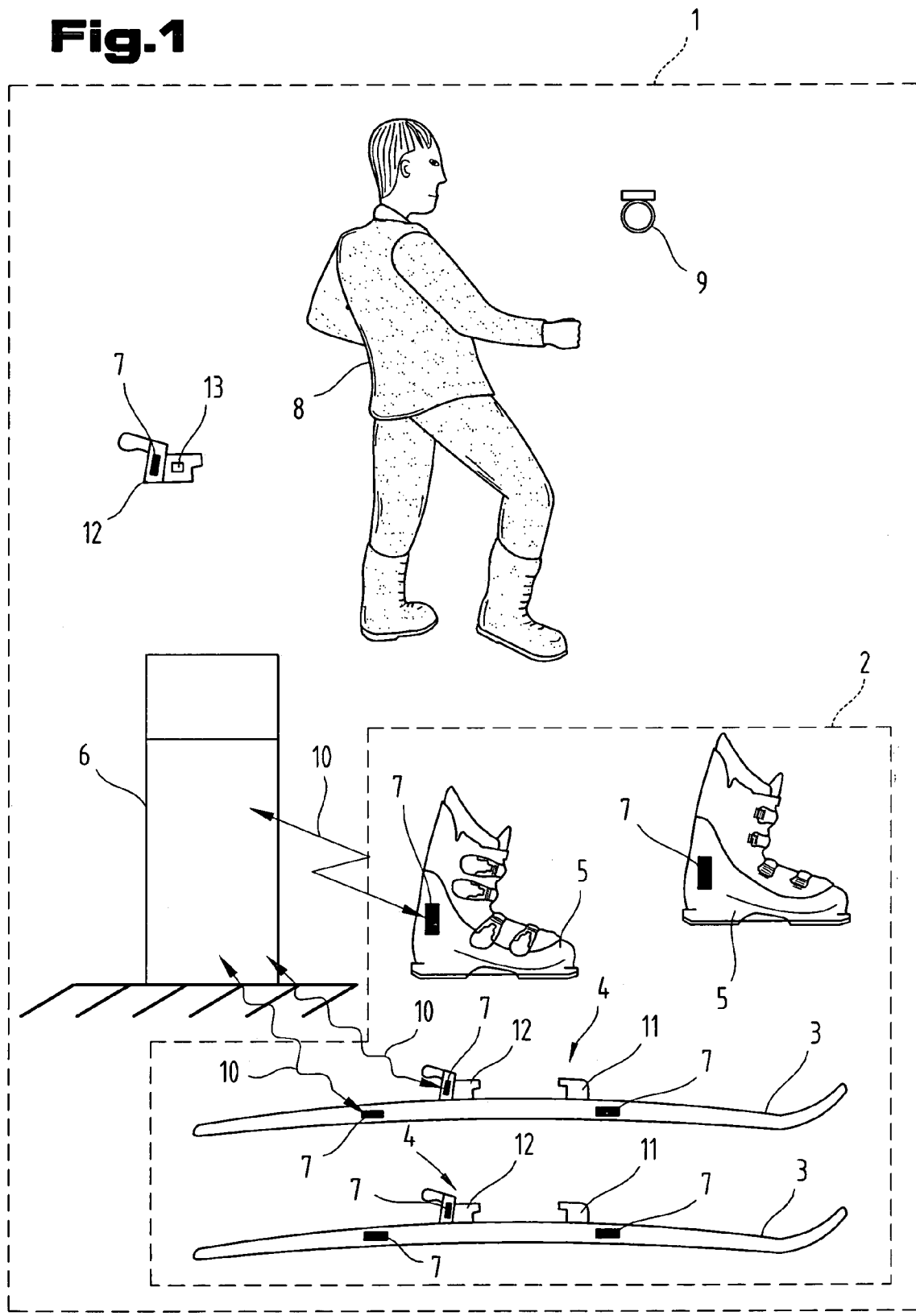
FIG. 1 is a simplified, schematic diagram depicting an example of a first embodiment of the electronic tracking system proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc, relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 depicts a first embodiment of the electronic tracking system 1 proposed by the invention.

An electronic tracking system 1 of this type is used to control and detect a combination of sporting articles 2 consisting of more than one structurally separate sporting articles, comprising a pair of board-type runner boards 3, a pair of retaining mechanisms 4 for sport shoes and a pair of sport shoes 5.

Accordingly, the electronic tracking system 1 has a control unit 6, which may or may not be stationary, several code transmitters 7 assigned to the individual sports particles and optionally a control unit 9 which can be worn on the body of the user 8.

As an example of a combination of sporting articles 2, the description will be based on a combination of at least two, generally three, sporting articles consisting of a board-type runner device 3, at least one retaining mechanism 4 for a sports shoe on the board-type runner device 3 and a sports shoe 5. By board-type runner device 3 is meant a ski, such as an Alpine ski or cross-country ski, or a touring ski or a trick ski as well as similar board-type runner devices 3, such as a snowboard, a surf board, a water ski and similar board-type runner devices 3, consisting of a single sports device or sports equipment used in pairs.

The tracking system 1 proposed by the invention may also be used in applications relating to tennis racquets and tennis shoes or for inline skates, roller boots, jogging shoes or football shoes, or also in the field of diving equipment.

The communication to check whether individual sporting articles are correctly matched or belong to one another is effected without contact between the stationary control unit 6 and/or the mobile control unit 9 and the individual code transmitters 7 via a radio route 10.

This being the case, the stationary control unit 6 may be mounted in the access region to sports facilities, lifts or pistes. Alternatively, however, the mobile control unit 9 may be used instead of or in addition to the stationary control unit 6. In order to identify the individual sporting articles, at least one code transmitter 7 is integrated in each of the sporting articles. These code transmitters 7 contain and display codes and code data about the respective sporting article to which they are physically assigned. For example, the board-type runner device 3 or another sporting article which is used largely separately is not just fitted with a single code transmitter 7, but may also contain several code transmitters 7. The number of code transmitters 7 will depend on several factors. In order to identify individual sporting articles clearly without any ambiguity, such as the sport shoe 5 or the board-type runner device 3 for example, it is sufficient to provide only a single code transmitter 7 as a rule. Where parts of a sporting article belong to one another functionally, for example the retaining mechanism 4 for a sport shoe, the front binding part 11 as well as the rear binding part 12 can each carry at least one separate code transmitter 7. Depending on requirements, the number of code transmitters 7 in individual sporting articles may also be "greater than one". This will be the case in particular if different types of measurement data, such as personal data, functional data, safety data or similar data, in particular temperature, speed, ozone values, vital functions, GPS position and other variables are to be detected by one or more sensors 13, taking the rear binding part 12 for this example, and transmitted to the or the respectively co-operating code transmitters 7.

Another option for integrating the mobile control unit 9 in a sports device is to provide it in the front or rear binding part 11, 12 or a retaining system on the sport shoe 5.

The mobile control unit 9 and/or the stationary control unit 6 is in any event a response point or target point of a data communication system involving the individual sporting articles making up the combination of sporting articles 2. Via the control unit 6 and/or 9, a check can be run, amongst other things, to ascertain whether the individual sporting articles belong to one another. To this end, the data of the code transmitters 7 is contactlessly read by the control unit 6 and/or 9 and data may optionally be stored in the code transmitters 7. By checking whether the latter belong to one another is meant that a check is run to ascertain whether the individual sporting articles are part of a combination of sporting articles 2 intended to be used in conjunction with one another. If they do not belong together, an appropriate warning can be issued by the control unit 6, 9 or the sporting article itself, preferably by visual or acoustic means. This being the case, the control unit 6, 9 may have a programming mode, enabling it to detect automatically the individual data and codes or ID codes of the code transmitter 7 of each sporting article belonging to a combination of sporting articles 2. Conversely, it would also be possible for the code transmitters 7 of one of the sporting articles belonging to a combination of sporting articles 2 to be programmed with unmistakable codes from the control unit 6 and/or 9.

As an alternative to or in combination with the above, a check may also be run to ascertain whether individual sporting articles are being used. For example, if a shoe designed for an alpine ski is being used in conjunction with a shoe designed for a touring ski, a warning can be triggered. Similarly, a mismatch of sporting articles intended for use in pairs, in particular board-type runner devices 3, may also trigger an appropriate alarm. A check may be run to ascertain whether a specific ski intended for use on the right-hand side is actually being used on the right foot by checking its spatial disposition or distance from the right or left sport shoe 5 or by linking up to the right or left sport shoe 5 for example. Naturally, it would also be possible to check the correct or intended use regarding the left-hand side or alternatively to check both sports devices of a pair of sporting articles to ensure that they are being used as intended.

By using sensors to detect characteristic data relating to sporting articles, another option is to issue a warning if parts of the individual sporting articles are defective, for example.

Figure 2:
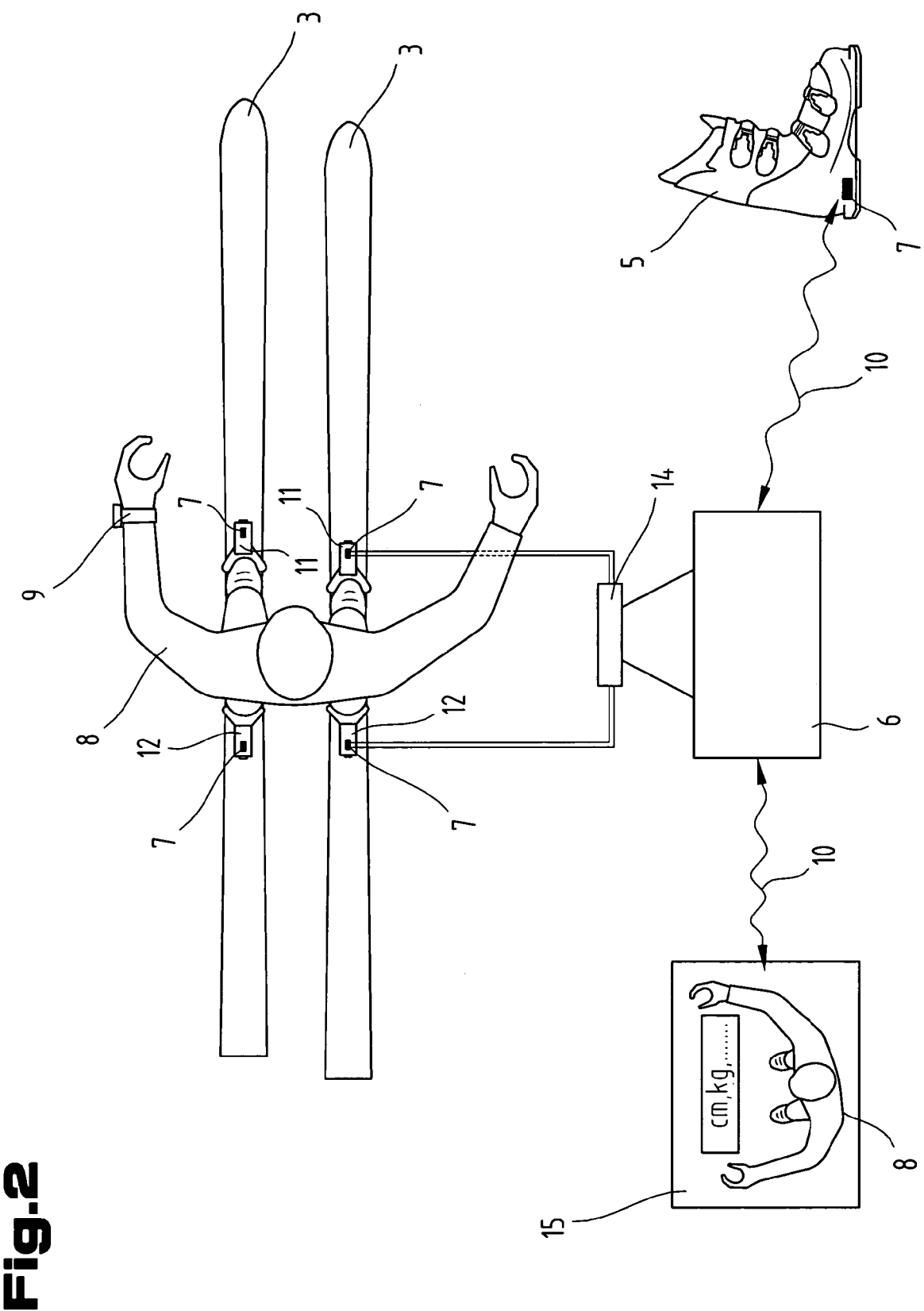
FIG. 2 depicts another embodiment of the electronic tracking system intended for use in servicing and maintaining combinations of sporting articles.

FIG. 2 illustrates an application where the electronic tracking system 1 is employed in a service and maintenance facility for sporting articles making up a combination of sporting articles.

In this embodiment, the tracking system 1 proposed by the invention may also be used in a repair, service or maintenance facility.

This being the case, personal data pertaining to the user 8 or parameter settings for the different sporting articles of the combination of sporting articles 2 can be stored in the stationary control unit 6. This stationary control unit 6 may be installed by dealers or by hire firms or service and repair companies. The personal data might include, for example, age, sex, name, weight, body size, information about bone structure, details of the foot such as pronate or supinate position, deviations in leg axis such as X- or O-legged positions and/or sporting ability. Depending on the purpose of the combination of sporting articles, the settings for the sporting articles may also include, for example, sole length, the so-called Z-value, a value for releasing the retaining mechanism for a sport shoe 4 relevant to safety, the type of sporting article, in particular the ski type, the device length and/or other data relevant to the settings and status of sports devices.

A detection unit 15 is used to detect the majority of this data and is preferably linked to the stationary control unit 6 via a radio route 10 or a cable connection in order to transmit signals and data. The maximum detection range proposed by the invention is 3m, in particular around 1 m. Again, personal data or settings for the sporting articles may be already stored in the mobile control unit 9 and forwarded to the stationary control unit 6 and an adjustment and/or assembly system 14. This adjustment and/or assembly system 14 may use the stored and measured data to adjust the force needed to release the retaining mechanism 4 of a sport shoe, for example, in particular the Z value, on an at least substantially automatic basis. In accordance with the invention, the electronic Z-value and other relevant settings status data for the retaining mechanism of a sport shoe, depending on the design of the sporting article, may be displayed via appropriate display systems such as passive or active display elements in the form of LCDs or LEDs or OLEDs or EL or ferro-electric display elements and be stored at the same time in the electronic tracking system 1, in which case the Z-value can be controlled so that it is not adjusted or changed except from an authorised point in order to ensure that the process is performed properly and as prescribed, in which case only this authorised point will be in a position to transmit this adjusted value to an external computer system, in other words a control unit 6, 9, using an appropriate operating system, and will be so using appropriate security structures of the cryptographic type, for example with a key system based on a law governed by signatures. This being the case, any adjustments made to the Z-value and other settings and status parameters will be logged, thereby ensuring that unauthorised settings or adjustments can not be overwritten or stored, at least in the internal operating system, and when contact is made via appropriate communication interfaces to an external operating system, such as computers on the internet, they can also be logged there as well.

Figure 3:
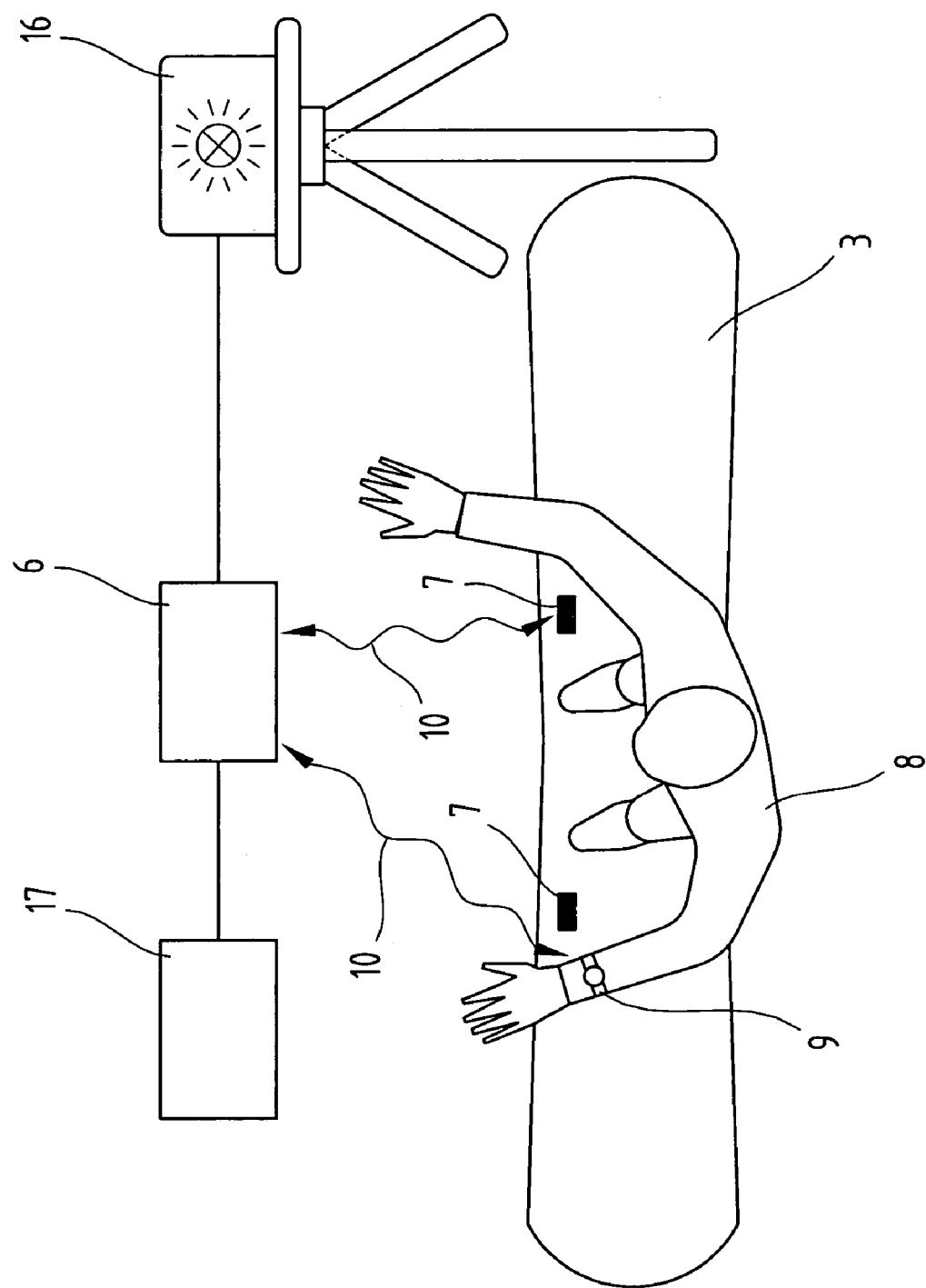
FIG. 3 shows the electronic tracking system in an application used to control access to sports facilities.

FIG. 3 illustrates another possible application or deployment of the electronic tracking systems, in particular for controlling access to sports facilities.

In this embodiment, the stationary control unit 6 is disposed in the access area to sports facilities, lifts or pistes and checks that the user 8 is authorised by verifying at least one of the code transmitters 7 and/or data stored in the mobile control unit 9. If the check returns a positive result, i.e. shows a match and confirms permission to enter, the lock of a turnstile 16, for example, is released, allowing access to the sports facility or the piste. If there is no match or the check returns a negative result, the turnstile 16 bars access and may trigger a visual or acoustic warning via an acoustic and/or optical output device disposed in the mobile control unit 9 or in the turnstile 16 itself or in the stationary control unit 6. The stationary control unit 6 may also be provided with a system 17 for handling payment transactions. This being the case, authorised access could be gained by making a cash payment or alternatively by means of a chip card, for example a bank card or credit card, enabling the data to be forwarded to a public system 17 handling cashless payment transactions. Once payment is made, the stationary control unit 6 forwards the requisite data to the code transmitters 7 or to the mobile control unit 9 and this data will then be stored in the memory so that it will be recognised again on re-entry and release access.

FIG. 4 illustrates a first embodiment of a code transmitter which may be used in the tracking system, in the form of a block diagram.

The code transmitters 7 integrated in the sporting articles are electronic or electromechanical components, for example so-called RFID elements (Radio Frequency Identification elements). By an RFID element hereafter is meant chip-support elements which operate without contact, in particular so-called transponder elements. RFID elements of this type have antennas 21 in the form of coils or dipoles, which usually operate in the wavelength range of from 100 to 135 kHz, in the HF range at 13.56 MHz or 27.125 MHz, in the UHF range from 400 to approximately 950 MHz, in particular at 423 or 826 or 868 or 915 MHz and/or in the microwave range at 2.45 GHz or 5.8 GHz or 24.125 GHz. These antennas 21 may be disposed on a base substrate or directly in an integrated circuit. Usually, the antenna geometries are provided in the form of electrically conductive tracks or wires. In the range used by microwave transponders, so-called slot antennas may also be used, this type of transponder design being of particular advantage in instances where metallic surface elements are used, and with a $\lambda/2$ slot of typically 6 cm, using 2.45 GHz, for example, thereby avoiding any detrimental effect on the strength of the sporting article.

In the embodiment illustrated in FIG. 4, the integrated circuit is essentially provided in the form of an electronic memory device 22. The transponders may detect specific data relevant to the safety and comfort of the user, such as product data, production data, personal data, functional data, safety data, hire data, the releasing force of the retaining mechanism 4 for a sport shoe, in particular a Z-value setting and similar, by means of appropriate sensors and transmitter elements or this data may be stored in the memory device 22, have being defined previously and stored there beforehand. The memory device 22 may be provided in the form of a non-volatile read-write memory, in particular an EEPROM or EPROM or PROM or a ROM memory module or a combination of these memory modules. Communications and data exchanges with the stationary control unit 6, for example, will then be run using passive RFID elements, in other words without a battery or electrical power pack, due to the fact that an external electronic device, in particular the stationary and/or mobile control unit 6, 9, can be powered by a capacitive or inductive coupling, in which case the antenna 21 will be used as the power supply for the integrated circuit (IC) and the memory device 22, as well as to transmit data.

If data relating to the respective sporting article is required to be read only, the invention proposes another embodiment in which one or more strip codes or one or more bar codes are applied in different positions on the surface or close to the surface of a sporting article, such as a "Universal Product Code" UPC/EAN or UPC-A (12 digit) or UPC-E (13-digit) or "Interleaved 2 of 5" or Code 128 or Codabar or Code 39 or Code 93 or 3D Barcode (Bumpy Barcode) or a 2-dimensional bar code, such as an ArrayTag, Aztec Code, Codablock, Code 1, Code 16K, Code 49, CP Code, Data Matrix, CIMatrix, Dot Code A, hueCode, Intacta.Code, MaxiCode, MiniCode, PDF 417, Micro PDF417, QR Code, SmartCode, Snowflake Code, SuperCode, Ultracode and other similar codes for example, as well as 3'-dimensional codes such as the 3-DI Code and other similar codes.

In order to obtain as thin as possible a RFID element, flip-chip contacts may be used for mounting and contacting the integrated circuits with the coil or dipole antenna base substrates. This being the case, the ICs are positioned with the structure side, in other words that accommodating the IC contact pads, directed towards the terminal faces of the antenna and soldered by means of anisotropic or isotropic, electrically conducting higher polymers, as well as conventional solder using laser welding, or by means of ultrasonic contact, friction weld contacts or alternatively using a so-called nano-piercing techniques, whereby small diamond and silicon splinters with dimensions of less than 5 to 10 µm on the IC pad surfaces are galvanically integrated in the surface and an IC of this type pushed onto an antenna contact surface, providing a contact surface with a drop of UV glue applied from a dispenser beforehand, for example, or some other method of application, onto this contact surface, after which the IC is pressed so that it can be contacted or mounted under the action on exposure to UV. As this takes place, the fine diamond particles or silicon particles galvanically coated with nickel or nickel-gold, for example, pierce the surface of the contact pad of the antenna terminals, thereby establishing good electrical contacts. Another specific option is to pierce thin oxide layers on the antenna terminal surfaces, this process being similar to that used when making contacts by friction welding or contacts by ultrasound, which means that the antenna base substrate is not placed under any stress due to heat. These so-called nano-piercing methods may also be combined with ultrasonic and micro-welding methods for making contacts.

When code transmitters 7 and accordingly RFID elements are applied to and integrated in sporting articles, such as at the front or rear binding part and a shoe, there tends to be only a very limited amount of available space and options as a rule, and in the case where they are integrated in a ski or snowboard or similar such runner devices, additional aspects also have to be taken into consideration in terms of the manufacturing process and the laminate coming apart. More recent board-type runner devices are made by a process of lamination and heat-forming or back-injecting and back-foaming several films and decorative laminates. In the case where a code transmitter 7 and RFID element is integrated during the production process, an RFID element has to be very precisely positioned in an inner layer of the structure of the board-type runner device. The generally flat RFID elements must be capable of withstanding subsequent processes, such as mechanical deformation, temperatures of up to 150° C. and more, or compression stress up to 600 N/cm², without function being impaired.

Since the integrated circuit (IC) mounted on a RFID element tends to stand proud due to its thickness, which is typically 150 µm, especially if a covering is provided in the form of an epoxy resin as a passivation means or to provide some mechanical protection, the IC is subjected to a high degree of stress during lamination or thermoforming, especially along the contact points. Although it would be feasible to make a cavity in one of the inner layers of a laminated board-type runner device, the RFID element and the IC disposed on it would have to be very precisely positioned relative to the position of this cavity. As a less expensive and more reliable option in production terms, another effective method has been found, whereby the thickness of the IC element is embedded in the overall thickness of the RFID element, which means that the high pressure induced during lamination and thermoforming or back-injection or back-foaming is uniformly distributed on the surfaces surrounding the IC. In modern board-type runner device constructions, tubular sections made from a special light metal alloy are used to increase stiffness and flexural strength whilst keeping weight to a minimum. Tubular metal elements of this type are of an almost round design in the binding region and become oval or flattened if a board-type runner device is subjected to stronger flexural forces. Also in modern board-type runner device constructions, metal films are often provided directly underneath the decorative laminate, as well as metal edge elements in another region lying farther underneath. In all these cases, therefore, an RFID elements must be applied directly adjacent to metal elements of this type and immediately below the uppermost layer, because if they were mounted below a metallic element it would have the effect of screening any reading field. In a manner that is generally known per se, an RFID element applied directly onto a metal surface or metal element will not receive enough energy due to the eddy currents in the metal surface or metal element generated by the electromagnetic field of the reading device, preventing it from functioning or permitting function but to a limited degree only, which would mean that only a small reading range could be operated. To get round this problem, the invention proposes that a layer of highly permeable ferrite elements should be inserted between the electronic code transmitter 7 and RFID element and the metal surface or metal element in order to prevent a parasitic field or interference in the form of these eddy currents, in which case this layer is made from highly permeable ferrite particles, which must be provided in an appropriate density and thickness. It has been found to be of practical advantage if these highly permeable ferrite particles have an average particle size of 11.0 to 46.4 µm, a specific weight of 2.50 or 3.08 g/cm$^3$, a surface of 1.4 or 0.8 m$^2$/g and a magnetic saturation of 79.5 or 82.1 EMU/g (at 3500 Oe), and are applied by means of a screen printing process to the reverse face of the RFID elements, for example. Solvent-based polymeric binding agents with an acrylate base are used for this purpose as well as those with a water-based PU binding agent. The best results have been achieved by applying several prints using water-based screen printing inks, because a higher degree of filling can be obtained, the drying process can take place more or less at room temperature and the planar position of the products is significantly better than has been achieved in solvent-based printing tests. Since a high degree of filling with highly permeable ferrite particles is necessary and, because the thickness of the layer will have to be in excess of 100 µm, it can be assumed that layers of this type will not be capable of withstanding the high flexing and fluctuating stresses to which a board-type runner device is subjected without the layers of laminate coming apart given that, in addition to the fact that the IC does not need a ferrite layer as an intermediate layer between it and a metal element lying underneath in order to function, the highly permeable ferrite-polymer matrix is preferably applied only in the area of the antenna geometry. As a result, there will be no excessive strain in the region of the ICs or contact points during manufacture of the board-type runner device.

The RFID elements are preferably applied by a roller, manually or automatically, at a desired position of a board-type runner device film in such a way that before being applied, another protective film is pulled off the code transmitter 7 and RFID element and the RFID element, which is provided with a self-adhesive label, can be applied at a precise position and secured so that it will not shift. The position is usually on the bottom face of the graphically designed decorative laminate, in other words the uppermost layer. However, given the various different structures used for board-type runner devices, it may also be of advantage to incorporate the RFID element in a second or third layer or film, and on the inside face of the laminate film which is sprayed and foamed. Another possible option is to provide RFID elements of this type with a self-adhesive layer on one side or both sides and provide the appropriate protective films, making it possible to obtain an adhesive contact and accurately repeatable positioning in an internal position of a board-type runner device structure, and to use layers of so-called hot-melt adhesive and/or adhesion-imparting layers. Depending on the construction of the board-type runner device, it may be of practical advantage to use a liquid adhesive and apply it continuously or intermittently in order to adhere and position the RFID element. In situations where no protective film has to be peeled off, the use of rollers for the RFID elements does not present any particular technical problems and these elements can also be applied piece by piece, manually or automatically.

In one advantageous embodiment, the RFID elements are integrated inside a board-type runner device structure, in which case an appropriate cavity is provided for the entire RFID element and for the usually upstanding IC from the outset, by subjecting an internally lying laminate film to a mechanical and/or heat treatment. Although this represents extra complexity in terms of manufacture and requires the RFID element and the IC to be positioned very exactly, the mechanical stress to which the RFID element as a whole is subjected during subsequent production steps and during use of the sports device, in particular a ski, is kept very low.

In certain situations, it may be of advantage in terms of production technology not to integrate the code transmitters 7 and RFID elements in the various sports devices until a later stage. This being the case, in order to secure the RFID element in the most effective way possible and protect it from mechanical damage, appropriate recesses are provided in the sporting device during the manufacturing process, which will facilitate assembly of the code transmitter 7 and RFID element, which is of a conducive graphic and design structure, by means of a simple and efficient snap-fit, clip-in, or screw connection, ultrasonic welding, vibration welding, friction welding, riveting, bonding, laser welding and similar. Although in principle the code transmitter 7 can be mounted in a detachable arrangement, it is preferably non-detachable or mounted so that it partially breaks when detached.

Alternatively, another option is to prepare the surface to which the RFID element is to be applied subsequently, either by milling, recessing, thermoforming, punching or any other mechanical and heat processing steps, so that a specially adapted RFID element with a matching graphic and design structure can be simply and efficiently fitted by a snap-in or clip-in fit, casting, screwing, ultrasonic welding, vibration welding, friction welding, riveting, bonding, laser welding and similar joining techniques. In principle, a detachable mounting technique may be used, although a non-detachable one is preferred. In particular, once a code transmitter 7 and a RFID element has been applied, it should not be possible to remove it from the sporting article without breaking the sports device and code transmitter 7. The method of mounting RFID elements subsequently also provides the option of retrofitting on existing sports devices which were not provided with these elements during the production process. In the case of sports equipment such as a shoe, different mounting processes other than those listed above may be used, for example stitching, seams, folds, crimping, mould casting (insert technology or inmould-technology), potting or embedding and similar such processes. With respect to the listed processes, it may also be of advantage, if applying the RFID elements to faces or surfaces that are going to be joined, to pre-treat them to ensure a good join. A corona treatment, plasma treatment, flame or chemical surface treatment may well be used in order to ensure a sound adhesion-imparting layer.

FIG. 5 illustrates another possible embodiment of the code transmitter used with the tracking system 1 proposed by the invention in the form of a block diagram.

In another advantageous embodiment of the invention, it is also possible to integrate active code transmitters 7 in the sporting articles. These active code transmitters 7 have a separate power supply system 23, which may be provided in the form of an electronic voltage source, piezo-elements, solar cells, Peltier elements or similar, for example. In a preferred embodiment, a transmitter and receiver unit 24 for communicating with other code transmitters 7 and/or a control unit 6 and/or 9 may be used for this purpose, which operates in the ISM (Industrial-Scientifical-Medical) frequency range, for example at 423 or 828 or 868 or 915 or 950 MHz, in which case special sensors and transmitter elements which can be connected to an appropriate interface 25 will detect values, for example for determining the pre-set releasing force of a retaining mechanism 4 for a sport shoe, in particular the value for Z-setting, in other words the setting for a safety binding as specified by the ISO (International Organization for Standardization) or conforming to the various relevant standards set out in the Technical Programme TC 83/SC 3 for ski bindings, after which they can be presented on a graphic display 26.

The interface 25 may be an Interbus, Profibus, CAN, DeviceNet, Ethernet, RS232, USB, Firewire or any other standard interface. Another option is to design the interface 25 to operate by wireless communication, in particular for Bluetooth technology, wireless-LAN or any other wireless networks.

Also presented in the display might be the operating status of the binding, in other words whether the binding is closed or open and whether the contact pressure is within preset values and/or operating hours and/or an indication when servicing is necessary or maintenance is necessary and/or a service interval and/or other logistical and/or organisational data, such as historical data pertaining to the entire service life of a sporting article and a sporting article combination 2, and/or an external reading device or control unit may optionally transmit and receive data by means of the transmitter and receiver unit 24 and an antenna, to enable visual and/or acoustic signals or displays relating to predefined actions to be presented via the graphic display 26 or a signalling device 28.

In particular, a visual display may be operated by means of passive or active display elements in the form of LCDs or LEDs or OLEDs or EL or ferro-electric display elements and similar elements, in which case these will more especially be integrated in the front binding part 11.

The data is centrally controlled and processed by a micro-controller 29 which can store data in the memory device 22 and read data from the memory device 22.

Another option is to set the transmission and/or receiving range and/or the receiving sensitivity of the code transmitters 7 to a specific level, thereby enabling the maximum communication range to be set to a specific distance, in particular a maximum of 30 m. This setting may be entered via the control unit 6, 9 or directly on the sporting article by appropriate means.

Configured in this way, an electronic tracking system 1 and in particular the integrated code transmitters 7, are preferably designed to last for several years of service life. Moreover, all electronic and mechanical components are preferably of a modular design and are integrated in the sports equipment in such a way that high impact loads, potential mechanical effects from pointed objects, such a ski stick tip for example, and extreme temperatures will not cause damage or adversely affect their function.

The service life of the power supply provided in the form of a battery can be further increased by integrating a motion sensor so that the entire electronic system is switched to a sleep mode if a pre-set period elapses without any movement, thereby making energy consumption extremely low.

In another embodiment of the present invention, the active code transmitter 7 communicates contactlessy with the mobile control unit 9 and the distance-measuring device to determine the distance to possible communication response points, the latter being integrated in the code transmitter 7 and/or in the control unit 6, 9. The distance measurement may be taken on the basis of a basic physical principle by measuring the propagation time of signals. Safety data relating to the functioning of the binding as well as theft-related data or data for parameters relevant to the sporting activity or the entire history of the sports equipment and the sports equipment combination 2 can be transmitted.

If using this embodiment of the electronic tracking systems 1 for a combination of sporting articles 2, it is also possible to trigger or activate an anti-theft system or alarm system by external activation based on an electromagnetic wave transmission or by external activation based on an infrared interface and/or magnetic systems and/or a mechanical switching procedure in at least one sporting article or a control unit 6, 9, preferably in the front binding part 11.

This function can simultaneously be stored in the operating system of the electronic tracking system 1 and in the external operating system or computer system or in a non-volatile read-write memory, for example an EEPROM.

The key factor is that an anti-theft system or alarm system 30 may not and can not be activated or triggered in this manner except from an authorised point and only this external authorised point can run a check to ascertain that the combination of sporting articles 2 of the respective electronic tracking system 1 belong together, including the optional checking and/or adjustment of the Z-value settings, which in turn means that only authorised points are able to log the history.

To prevent certain functions from being activated by non-authorised persons, appropriate security structures and an appropriate operating system with encryption structures can be set up and optionally used in conjunction with key encryption methods conforming to specific signature laws. Any shift in the Z-value can also be logged in the internal and external operating system by means of the electronic tracking system 1.

In another embodiment of the anti-theft and alarm system 30, which has a power supply 23 and display 26 and various sensors in the electronic tracking system 1, preferably integrated in the front and/or rear binding part, it can be programmed so that a visual and/or acoustic alarm is triggered after a pre-selected period of motion or after a pre-selected time without any communication with at least one control unit 6, 9, for example. This alarm signal can also be activated locally and on a timed basis at specific points, in particular on entering a lift facility or entering a service point or hire point or alternatively also by mobile control units 9, in which case the allocation and authorisation structure of the data exchange or the read-only memory or the read-write memory can be controlled and secured by means of an appropriate operating system structure with corresponding security devices.

This visual and/or acoustic alarm or corresponding electromechanical or electromagnetic actions may be activated on a selective basis in an electronic tracking system 1 of the combination of sporting articles 2 or via the external operating system.

An alarm can also be triggered if the binding is set incorrectly or if sporting articles are being used which do not belong together, such as the use of sport shoes 5 that are not authorised for use with one another in the electronic tracking system 1.

In one special embodiment of the present invention, the Z-value specified in the DIN standard is displayed with the electronic tracking system 1 in the front and/or in the rear binding part 11, 12 with the aid of an appropriate display element.

The binding can be adjusted to a feasible long-term setting by an authorised point only, which will then forward the Z-value setting to the external operating system higher in the hierarchy or stores it in an EEPROM of the operating system of the electronic security system, for example. Incorrect adjustments or changes to the safety setting of the retaining mechanism 4, for example by the user, can be damaging to the health or cause injuries and such tampering with the combination of sporting articles can be checked using the original data or original codes of the code transmitters 7. This provides an effective means of countering claims for liability due to injury caused by incorrect use of or inappropriate changes made to individual sporting articles.

The front and rear binding parts 11, 12 are set by means of mechanical components in the binding parts.

Standard settings for a safety binding are specified by the ISO (International Organization for Standardization) or by corresponding standards in the Technical Programme TC 83/SC 3 for ski bindings and similar standards, which stipulate a specific Z-value. The mechanical adjusting components of the safety binding are linked to special sensors and transmitter elements and the electronic display is calibrated to the standardised setting forces during production.

The Z-values set by an authorised point are then memorised and stored in the electronic tracking system 1 and/or in the respective code transmitters 7 of the retaining mechanism 4.

Quite apart from this Z-value fixed by an authorised point, a whole range of additional data can be set by the authorised point in the operating system of the electronic tracking system 1 for a combination of sporting articles 2, such as the identification numbers of the various RFID elements of the individual sporting articles, product and production data as well as personal data such as shoe size, sole length and similar information, thereby enabling the history log of a sporting article or a combination of sporting articles 2 to be tracked and analysed throughout its service life.

In one special embodiment of the present invention, an electronic component of the electronic tracking system 1 in the form of a graphic and shaped element is designed so that all electronic and electromechanical components are integrated in this element, such as a base board with a central micro-controller 29 including a memory device 22, in particular a non-volatile read-write memory such as an EEPROM and a volatile read-write memory such as a RAM as well as a flash memory and a display 26 with the corresponding drivers, a transmitter and receiver unit 24, in particular an ISM frequency module for two-way contactless data transmission with an external reader or an external computer system, a power supply unit 23 in the form of a long-life battery, for example a lithium battery, an RFID element emulator for 13.56 MHz or 2.45 GHz or 125 kHz transponders for example, and optionally various transmitter elements and sensors, e.g. for detecting the Z-value and/or other settings and status data for a retaining mechanism 4 of a sport shoe, such as sensors to detect temperature, speed, ozone readings, vital functions, GPS position, for example, and for the battery voltage in addition to a mechanical on-off switch and a motion sensor for activating and deactivating the tracking system 1, a real-time clock module, an interface for the data transmission, an interface for serial communication, for example via a RS232 interface, optical function-control and status display LEDs, an open/closed binding status sensor, a contact pressure sensor, a voltage transformer for the battery voltage, for example from 3 Volt-DC to 5 Volt-DC, for supplying the various sensors and transmitter elements and similar components.

The base board with the various components can then be disposed in the housing of the retaining mechanism 4 for a sport shoe, but may also be provided as a design-feature element of a retaining mechanism 4 for a sport shoe and may be integrated in a modular design as a unit and tested during assembly of the retaining mechanism 4 of a sport shoe.

Figure 6:
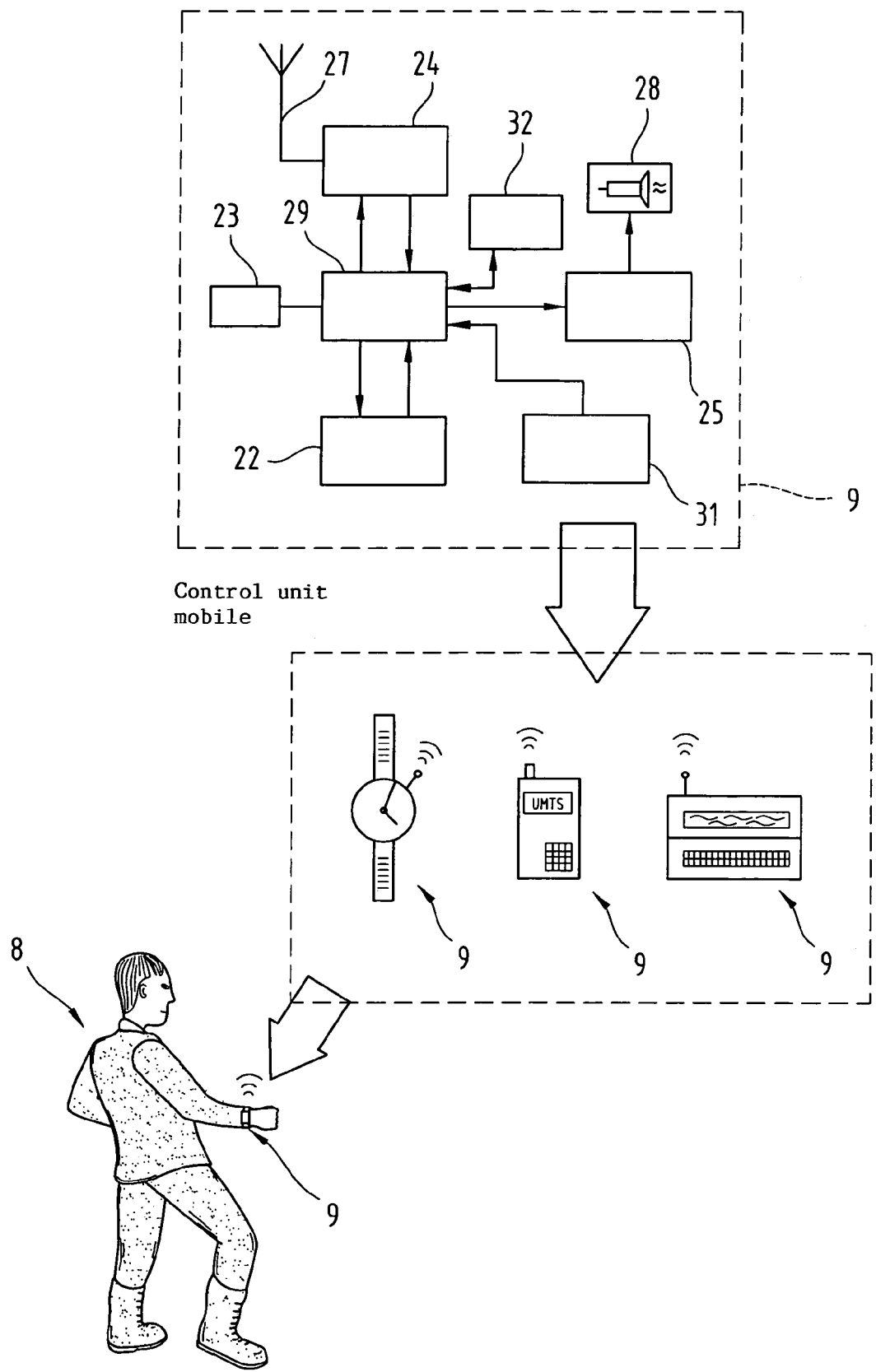
FIG. 6 illustrates the principle by which a mobile control unit is operated.

FIG. 6 is a block diagram illustrating the main layout or design of a mobile control unit 9.

For the purposes of the invention, the various sporting articles belonging to a combination of sporting articles 2 may communicate with a stationary or a mobile control unit 6, 9 through contactless communication. The mobile control unit 9 may be provided in the form of a mobile electronic element worn on the body, for example a so-called wrist-top-computer, in particular a wrist watch, or alternatively as a mobile telephone, in particular a mobile telephone equipped for UMTS or a hand-held, software driven miniature computer such as a palmtop or handheld computer or by any other similar computer system. This being the case, communication between the individual units is wireless.

In addition to containing user-related data, the control unit 9 may also contain data relating to the sporting article combination 2, in which case the control unit 9 will preferably assume the tracking and control functions of the tracking system 1 proposed by the invention, as described above in connection with FIGS. 1 to 5.

It should be pointed out that the properties and functions of individual component groups illustrated in FIG. 5 also apply to the situation illustrated in FIG. 6 and active code transmitters 7 may take over the jobs handled by the control unit 9 in an appropriate extension stage and vice versa.

The control unit 9 also has an input unit 31, by means of which the actions of the user 8 can be entered in the control unit.

To keep data transmissions between the separate individual sporting articles and/or the control units 6, 9 in the tracking system 1 secure, an encryption module 32 is used, which provides the requisite cryptographic structures and the signature rules governing the encryption methods.

In another embodiment, the control unit 9 may be integrated in a front or rear binding part 11, 12 and/or the so-called wrist-top-computer handles information and display functions only, on the basis of a wireless communication.

Another option is to set the transmitter range and/or the reception sensitivity of the control unit 9 to a specific level thereby setting the maximum communication distance to a specific distance, which is 30 m in particular, preferably 1 m to 3 m. This setting can be entered from the input unit 31.

For the sake of good order, it should be pointed out that in order to provide a clearer understanding of the electronic tracking system 1, it and its constituent parts are illustrated to a certain extent out of scale and/or on an enlarged scale and/or on a reduced scale.

The inventive solutions used to achieve the set objectives may be found in the description.

Above all, the individual embodiments of the solutions proposed by the invention illustrated in FIGS. 1; 2; 3; 4; 5; 6 may be construed as independent solutions proposed by the invention in their own right. The objectives and associated solutions proposed by the invention may be found in the detailed descriptions of these drawings.

LIST OF REFERENCE NUMBERS

1 Tracking system
2 Combination of sporting articles
3 Board-type runner device
4 Retaining mechanism
5 Sport shoe
6 Control unit (stationary)
7 Code transmitter
8 User
9 Control unit (mobile)
10 Radio route
11 Binding part (front)
12 Binding part (rear)
13 Sensor
14 Adjustment and assembly system
15 Detection unit
16 Turnstile
17 System
18
19
20
21 Antenna
22 Memory device
23 Power supply unit
24 Transmitter and/or receiver unit
25 Interface
26 Display
27 Antenna
28 Signalling device
29 Micro-controller
30 Anti-theft system
31 Input unit
32 Encryption module

What is claimed is:

1. An electronic tracking system for a combination of sporting articles consisting of a plurality of structurally different sporting articles including a retaining mechanism for a sport shoe and a sport shoe, comprising
   (a) at least two code transmitters integrated respectively in the retaining mechanism for the sport shoe and in the sport shoe and assigned to the retaining mechanism and the sport shoe,
      (1) at least one of the code transmitters assigned to the retaining mechanism containing and displaying data relating the properties and/or settings of the retaining mechanism, and
      (2) at least one of the code transmitters assigned to the sport shoe containing and displaying data relating the properties and/or settings of the sport shoe, and
   (b) at least one control unit for contactlessly detecting the data of the code transmitters integrated respectively in the retaining mechanism for the sport shoe and in the sport shoe, the control unit being arranged to analyze the data and to ascertain whether the retaining mechanism for the sport shoe and of the sport shoe have the properties and/or settings to make their combination safe.

2. The electronic tracking system of claim 1, wherein the control unit has a maximum detection range of 3 m.

3. The electronic tracking system of claim 1, wherein the control unit has a maximum detection range of 1 m.

4. The electronic tracking system of claim 1, wherein the retaining mechanism is a board-type runner device.

5. The electronic tracking system of claim 1, wherein at least one of the code transmitters is designed to communicate with other code transmitters and/or at least one of the control units.

6. The electronic tracking system of claim 1, wherein the control unit is a software-operated, commercially available portable computer.

7. The electronic tracking system of claim 6, wherein the computer has at least one interface for local or remote transmission of signals and data via a local-area or global network.

8. The electronic tracking system of claim 1, wherein the control unit is a so-called palmtop or a mobile telephone.

9. The electronic tracking system of claim 1, wherein the control unit is a computer in the form of a wrist watch which can be worn on the human body and is supplied by an electric mains network or a separate power supply.

10. The electronic tracking system of claim 1, wherein the control unit is a software-operated mobile telephone for UMTS mobile telephone networks.

11. The electronic tracking system of claim 1, wherein a plurality of the code transmitters of the sport articles belonging together or intended to be used together have a code that cannot be mistaken for codes of other sport article groups.

12. The electronic tracking system of claim 1, wherein at least one of the code transmitters contains and displays physiological and/or performance-related data pertaining to a user.

13. The electronic tracking system of claim 12, wherein at least one of the control units can be worn on the body and contains and displays physiological and/or performance-related data pertaining to a user.

14. The electronic tracking system of claim 1, wherein at least one of the control units is stationary and disposed at an access area to a sports facility.

15. The electronic tracking system of claim 1, wherein at least one of the control units has a visual and/or acoustic output device for issuing information.

16. The electronic tracking system of claim 1, wherein at least one of the sporting articles has a visual and/or acoustic output device for issuing information.

17. The electronic tracking system of claim 1, wherein at least one of the code transmitters contains and displays personal data and owner-related data.

18. The electronic tracking system of claim 1, wherein at least one of the control units checks the data of the code transmitters assigned to the retaining mechanism and the sport shoe to ascertain that they are correctly used and that they belong together.

19. The electronic tracking system of claim 1, wherein at least one of the control units checks the date of the code transmitter assigned to the retaining mechanism and the data of a code transmitter of a user or of a personal, user-side control unit to ensure correct use and that they belong to each other.

20. The electronic tracking system of claim 1, wherein at least one of the control units has a standard communication interface for loading and/or downloading data from and/or to a public communication network.

21. The electronic tracking system of claim 1, wherein the data of at least one of the code transmitters are codes or pointers for data sets stored in at least one of the control units and/or in an external data network.

22. The electronic tracking system of claim 1, wherein the data of the code transmitters can be fixed and/or edited exclusively by an authorized point.

23. The electronic tracking system of claim 1, comprising a sensor connected to at least one of the code transmitters for detecting system-related parameters or changing parameter values.

24. The electronic tracking system of claim 23, wherein the sensor is designed to detect a release force of the retaining mechanism.

25. The electronic tracking system of claim 23, wherein the sensor is designed to detect a Z-value setting of a safety ski binding.

26. An electronic tracking system for a combination of sporting articles consisting of a plurality of structurally separate sporting articles including sporting articles designed for use in pairs, comprising
(a) at least two code transmitters assigned to the pairs of sporting articles, at least one of the code transmitters signaling intended use on the left and/or right, and
(b) a network for transmitting data between the code transmitters and at least one control unit for detecting that the sporting articles are used on the intended side.

27. The electronic tracking system of claim 26, wherein at least one of the control units distinguishes between a sporting article intended for use on the right-hand and/or left-hand side and checks that they are being used correctly.

28. The electronic tracking system of claim 26, wherein the sporting articles designed for use in pairs are board-type runner devices, further comprising a code transmitter assigned to a sport shoe, and at least one of the control units checking the use of at least one of the board-type runner devices on the designated side of a user.

29. The electronic tracking system of claim 26, wherein at least one of the code transmitters and of control units keeps a constant log of changing data and stores at least the last up-to-date set of data in a memory device.

30. An electronic tracking system for a combination of sporting articles consisting of a plurality of structurally separate sporting articles, comprising
(a) at least two code transmitters respectively assigned to two sporting articles,
(b) at least one control unit in contactless communication with the code transmitters for communication between the code transmitters and the control unit over a range of 30 m,
  (1) at least one code transmitter and/or the control unit has a distance-measuring system for determining the distance from a possible communication response point, and
  (2) the control unit has a programming mode enabling the code transmitters to detect the sporting articles of the combination automatically.

* * * * *